Figure 1:
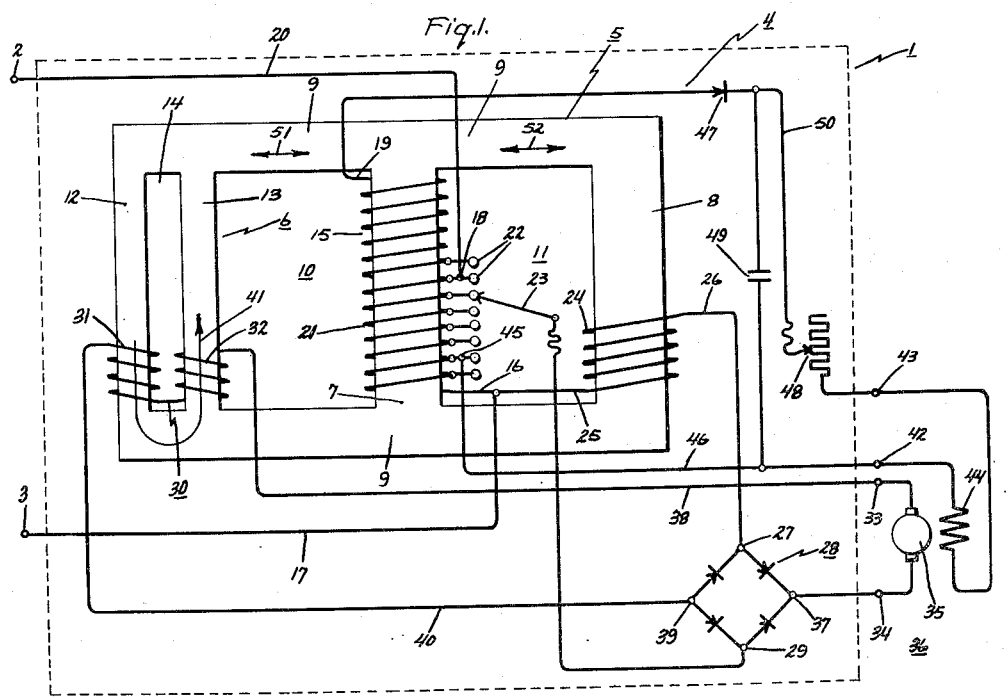

Aug. 27, 1957  M. W. SIMS  2,804,584

DIRECT CURRENT MOTOR SPEED CONTROL SYSTEM

Filed Nov. 2, 1956

Inventor:
Marion W. Sims,
by His Attorney.

2,804,584

DIRECT CURRENT MOTOR SPEED CONTROL SYSTEM

Marion W. Sims, Chappaqua, N. Y., assignor to General Electric Company, a corporation of New York Application November 2, 1956, Serial No. 620,078

5 Claims. (Cl. 318—332)

This invention relates to control systems for direct current motors and more particularly to a system for operating a direct current motor and selectively controlling the motor speed from the alternating current source.

There are many applications for electric motors in which variable speed is highly desirable, for example, in the operation of machine tools, home workshop equipment, etc. The common types of alternating current motors, e. g., induction and synchronous motors, cannot be operated at selectively variable speeds when supplied with alternating current of fixed frequency. Direct current motors, on the other hand, can provide the desired speed variation, however, alternating current power is generally the only type now supplied by utilities. In order, therefore, to operate direct current motors from an alternating current source of power, numerous control systems have been devised including the Ward-Leonard system and various systems including Thyratron tubes. These systems have been most advantageously employed for operating larger direct current motors; the costs involved have generally precluded their use on direct current motors in the smaller sizes.

It is therefore desirable to provide a system for operating a direct current motor and for selectively controlling the speed thereof from an alternating current source, such a system being sufficiently inexpensive to permit its general use with small direct current motors. The cost element involved will preclude the use of rotating machines, as in the Ward-Leonard systems, and also the use of Thyratron-type tubes, since these tubes themselves are expensive and further since the use of a half-wave tube rectifying circuit requires de-rating the motor, e. g., using a nominally one-half horsepower rated motor to obtain one-third horsepower. It is therefore desirable that to satisfy the economic requirements, a control system utilizing static magnetic components be provided.

There is an additional requirement which must be met by such a system, namely the provision of good regulation of motor speed for changes in load, i. e., at any given speed setting, the motor speed should remain relatively constant over wide changes in load. The speed of a direct current motor is conventional represented by the formula $$n = \frac{V - I_a R_a}{K \phi N}$$

where $n$ is the motor speed, $V$ is the line voltage, $I_a$ is the armature current, $R_a$ is the armature circuit resistance, $\phi$ is the field flux, and $K$ and $N$ are constants for any given motor. The factor $I_a R_a$ is referred to as "armature drop" and it will be seen that it is directly proportional to armature or load current. It is thus seen that motor speed is directly proportional to the net voltage available, i. e., line voltage minus armature drop and inversely proportional to field flux. In the case of a separately-excited shunt-wound motor where field flux remains constant, it will be seen that the motor speed on any given line voltage will decrease with increasing load.

In order therefore, to provide a direct current motor speed control system with good speed regulation for changes in load current, it is necessary to compensate for armature drop. There is thus added to the previously set forth requirements, the additional requirement that the control system compensate for armature drop.

Circuits for operating direct current motors and for controlling the motor speed from an alternating current source and which at least in part compensate for armature drop have been proposed in the past. These circuits in general included an adjustable output voltage autotransformer for selecting the desired operating voltage and speed, a rectifier for supplying the armature current, and a saturable core reactor having a saturating winding energized by armature current. It is readily apparent that such circuits require an autotransformer and a separate saturable core reactor as a minimum and it is therefore desirable, again for economic reasons, to provide a system of the type here under consideration which will yield the same results as previous systems but which requires only a single core.

It is, therefore, an object of this invention to provide an improved control system for operating a direct current motor and for seelctively controlling the speed thereof from an alternating source.

Another object of this invention is to provide an improved direct current motor speed control system having good regulation of motor speed for changes in motor load.

A further object of this invention is to provide an improved direct current motor speed control system in which the foregoing objects are accomplished by use of only one magnetic core.

Further objects and advantages of this invention will become apparent from the following dscription and the accompanying drawings and the features of novelty which characterize this invention will be pointed out with particularity in the claims annexed to and forming a part of this specification.

This invention in its broader aspects provides a control system for operating a direct current motor and for selectively controlling the speed thereof from the alternating current source, the system comprising a transformer having a core including a main magnetic path and a shunt magnetic path, the two paths having a common portion such that a single winding may be made to link both. A winding is arranged on the common portion of the core, linking both the main and shunt magnetic paths, and having at least a part thereof adapted to be connected across a source of alternating current thereby to form the primary winding of the transformer. Means are provided for obtaining a selectively variable voltage output from the transformer, such as for example by use of taps on said winding. The transformer further has a secondary winding on its core linking only the main magnetic path. Rectifying means are provided having its input connected to the means for obtaining a selectively variable voltage; and a direct current saturating winding is arranged on the core linking only the shunt magnetic path. The output of the rectifying means and the direct current saturating winding are adapted to be serially connected with the motor armature so that the saturating winding is energized by motor armaure current.

Figure 2:
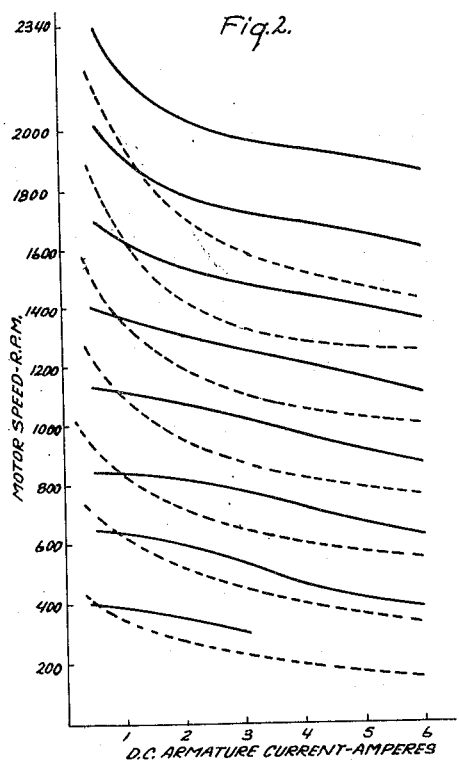

In the drawing,

Fig. 1 is a schematic illustration showing the improved direct current motor speed control circuit of this invention; and Fig. 2 is a set of speed torque curves comparing the performance of the circuit of Figure 1, shown in solid lines with that of a conventional shunt wound direct current motor without compensation for armature drop shown in dotted lines.

Referring now to Fig. 1, the improved direct current speed control system of this invention, generally identified as 1, includes a pair of input terminals 2 and 3 adapted to be connected to a suitable external source of single phase alternating current, such as 120 volts, 60 cycles. A transformer 4 is provided having a core 5 with three parallel, transverse and spaced apart legs 6, 7, and 8 joined by side portions 9 thereby defining windows 10 and 11. The core leg 6 is divided into two portions 12 and 13 which respectively define a window 14. Core legs 7 and 8 together with the joining sections of side portions 9 form a main magnetic path while legs 7 and 6 together with their joining side portions 9 form a shunt magnetic path.

A winding 15 is arranged on the center leg 7 and it will thus be seen that this winding links both the main and shunt magnetic paths. One end 16 of winding 15 is connected to input terminal 3 by a conductor 17 while a point 18 intermediate end 16 and the other end 19 of winding 15 is connected to the other input terminal 2 by conductor 20. It is thus seen that the portion of winding 15 intermediate end 16 and point 18 forms a primary winding 21. It will, of course, be readily apparent that the portion of winding 15 selected for use as the primary winding is entirely a matter of design and that in any given case, all of the winding 15 may be utilized as the primary winding or a lesser part, as shown in Fig. 1. It is further apparent that a separate insulated primary winding could be provided.

Winding 15 is provided with a plurality of taps 22 which cooperate with a tap switch 23 in order to obtain a selectively variable voltage from winding 15 as will be hereinafter described. A secondary winding 24 is arranged on leg 8 of core 5 and thus links only the main magnetic path. Secondary winding 24 has its one end 25 connected to end 16 of winding 15 and its other end 26 connected to input terminal 27 of bridge rectifier 28. The other input terminal 29 of rectifier 28 is connected to tap switch 23 and it will now be seen that the secondary winding 24 of the transformer 4 is thereby connected to the primary winding 21 of winding 15 in autotransformer relationship.

A direct current saturating winding 30 is provided having two parts 31 and 32 respectively arranged on portions 12 and 13 of leg 6 of core 5 and connected in series. A pair of output terminals 33 and 34 are provided adapted to be connected to the armature 35 of shunt-wound direct current motor 36. Output terminal 34 is connected to output terminal 37 of bridge rectifier 38 while output terminal 33 is connected to portion 32 of direct current saturating winding 30 by conductor 38. The other output terminal 39 of bridge rectifier 28 is connected to the other portion 31 of direct current saturating winding 30 by conductor 40. It will now be seen that output terminals 37 and 39 of bridge rectifier 28 are serially connected with direct current saturating winding 30 across output terminals 33 and 34 so that the rectified armature current of motor 36 energizes direct current saturating winding 30. Portions 31 and 32 of direct current saturating winding 30 are arranged in aiding relationship so that the unidirectional flux produced in portions 12 and 13 of legs 6 of core 5 as a result of the flow of armature current is in the direction shown by the arrow 41, i. e., traversing only portions 12 and 13 of leg 6.

Another pair of output terminals 42 and 43 are provided adapted to be connected to shunt field exciting winding 44 of motor 36. Output terminal 42 is connected to point 45 on winding 15 by conductor 46 while half-wave rectifier 47 and adjustable resistor 48 are serially connected between end 19 of winding 15 and output terminal 43. It will now be seen that the portion of the winding 15 between point 45 and end 19 provides the voltage for energizing the field 44 of motor 36 and that the specific portion of winding 15 used for this purpose is again a matter of design in any specific instance. A capacitor 49 is connected across conductor 46 and conductor 50 which joins rectifier 47 and variable resistor 48, and serves to smooth the ripple and increase the direct current provided by half-wave rectifier 47.

The operation of the device described above will now be set forth. It will be seen that with the circuit of armature 35 of motor 36 open so that no armature current is flowing in direct current saturating winding 30, the exciting flux produced by primary winding portion 21 of winding 15 will divide substantially equally between legs 6 and 8 as shown by the arrows 51 and 52. The flux flowing in the main magnetic path, i. e., in the direction of arrow 52 and leg 8 links secondary winding 24 and induces a voltage therein which is combined with the voltage across that portion of winding 15 selected by tap switch 23 and impressed on input terminals 27 and 29 of bridge rectifier 28. When the armature circuit of motor 36 is closed, armature current will flow in saturating winding 30; however, with no load on motor 36, the unidirectional flux produced by winding 30 will not vary the reluctance of leg 6 to any substantial degree and therefore the flux produced by winding 15 will continue to be divided substantially equally between legs 6 and 8. It is here to be noted that the flux produced by winding 15 traversing portions 12 and 13 of leg 6 will induce voltages in portions 31 and 32 of winding 30 however, by virtue of the connection of these windings, these voltages are substantially equal and opposite and therefore cancel. As the load on motor 36 is increased, the armature current increases correspondingly thus increasing the unidirectional flux 41 produced by winding 30 thereby tending increasingly to saturate leg 6 of core 5. This in turn, increases the reluctance of leg 6 and since the flux produced by winding 15 will divide between leg 6 and leg 8 in proportion to their relative reluctances, an increasing proportion of flux will be diverted to leg 8 and thus will link the secondary winding 24 to thereby increase the voltage induced therein. It will now be readily apparent that an increase in armature current in motor 36 accompanying an increased load, and which is accompanied by an increase in armature drop, causes an increase in the voltage induced in secondary winding 24 which tends to compensate for the increase in armature drop thereby to hold the speed of the motor more nearly constant, in accordance with the speed formulae set forth above.

It will be seen that the line voltage V factor in the speed formula set forth above is selected by tap switch 23 and therefore that switch 23 serves to select the desired operating speed of motor 36.

A system has been assembled in accordance with Figure 1 for operating a ½ horsepower direct current motor. In this system, core 5 of transformer 4 was formed of a 1½ inch stack of laminations with an overall length of 6¾ inches and an overall width of 5⅝ inches, with legs 7 and 8 being 1⅛ inches wide, side portions 9 being 1⅛ inches wide, and portions 12 and 13 of leg 6 being 9/16 inch wide with window 14 being 9/16 inch wide. The extended portion of winding 15 was formed of 350 turns of .0142 inch diameter wire and primary winding section 21 included 292 turns of .0679 inch diameter wire. There were eight taps 22 utilized in this system, the same number as shown in Fig. 1. Secondary winding 24 was formed of 58 turns of .0508 inch wire, while portions 31 and 32 of direct current saturating winding 30, were each formed of 128 turns of .0679 inch wire. Capacitor 49 had a capacitance of 40 microfarads and germanium rectifiers were used for rectifiers 28 and 47.

Fig. 2 shows typical speed-torque curves, i. e., motor speed plotted against armature current, obtained with the system of Fig. 1 described above (shown in solid lines)

compared with comparable speed torque curves of the same motor alone without the armature drop compensating arrangement of this invention (shown in dotted lines). It will be observed that the speed regulation of the motor, i. e., control of speed with increasing armature current with the circuit of Fig. 1 is substantially improved over the speed regulation of the same shunt excited motor operated without the armature drop compensation.

It will be readily apparent that the selectively variable voltage output of winding 15 can be made continuously variable rather than in a predetermined number of precise steps as with the use of taps as shown in Fig. 1. It will also be readily apparent that the relative positions of the windings 15, 24 and 30 may be changed, i. e., leg 7 and winding 15 may be on the outside and portions 12 and 13 of legs 6 together with winding 30 may be the middle or the position of winding 15 and winding 24 may be reversed.

It will not be readily apparent that this invention provides an improved system for operating a direct current motor and for selectively varying the speed thereof from a source of alternating current, the system providing substantial compensation for armature drop and utilizing only a single static magnetic component.

While I have illustrated and described a specific embodiment of this invention, further modifications and improvements will occur to those skilled in the art. I desire that it be understood therefore that this invention is not limited to the specific form shown and I intend in the appended claims to cover all modifications which do not depart from the spirit and scope of this invention.

What I claim as new and desire to secure by Letters Patent of the United States is:

1. A control system for operating a direct current motor and for selectively controlling the speed thereof from an alternating current source, said system comprising a pair of alternating current input terminals, a transformer having a core, said core having a main magnetic path and a shunt magnetic path, a first winding on said core linking both said main and shunt magnetic paths and having at least a part thereof connected across said input terminals thereby to form a primary winding, a secondary winding on said core linking only said main magnetic path, means for obtaining a selectively variable voltage output from said transformer, rectifying means having its input connected to said means for obtaining a selectively variable voltage output, a direct current saturating winding on said core linking only said shunt magnetic path, and a pair of direct current motor armature output terminals, the output of said rectifying means and said saturating winding being serially connected across said output terminals whereby said saturating winding is energized by a motor armature current.

2. A control system for operating a direct current motor and for selectively controlling the speed thereof from an alternating current source, said system comprising a pair of alternating current input terminals, a transformer having a core, said core having a main magnetic path and a shunt magnetic path, a first winding on said core linking both said main and shunt magnetic paths and having at least a part thereof connected across said input terminals thereby to form a primary winding, means for obtaining a selectively-variable voltage from said winding, a secondary winding on said core linking only said main magnetic path, rectifying means having its input serially connected with said secondary winding across said means for obtaining a selectively variable voltage thereby forming an autotransformer connection of said secondary winding to said primary winding, a direct current saturating winding on said core linking only said shunt magnetic path, and a pair of direct current motor armature output terminals, the output of said rectifying means and said saturating winding being serially connected across said output terminals whereby said saturating winding is energized by motor armature current.

3. A control system for operating a direct current motor and for selectively controlling the speed thereof from an alternating current source, said system comprising a pair of alternating current input terminals, a transformer having a core, said core having a main magnetic path and a shunt magnetic path, a first winding on said core linking both said main and shunt magnetic paths and having at least a part thereof connected across said input terminals thereby to form a primary winding, said first winding having a plurality of taps thereby to obtain a selectively variable voltage therefrom, switching means for selecting said taps, a secondary winding on said core linking only said main magnetic path, rectifying means having its input serially connected with said secondary winding across said switching means and a point on said primary winding thereby forming an autotransformer connection of said secondary winding to said primary winding, a direct current saturating winding on said core linking only said shunt magnetic path, and a pair of direct current motor armature output terminals, the output of said rectifying means and said saturating winding being serially connected across said output terminals whereby said saturating winding is energized by motor armature current.

4. A control system for operating a direct current motor and for selectively controlling the speed thereof from an alternating current source, said system comprising a pair of alternating current input terminals, a transformer having a core, said core having a main magnetic path and a shunt magnetic path, a first winding on said core linking both said main and shunt magnetic paths and having at least a part thereof connected across said input terminals thereby to form a primary winding, means for obtaining a selectively variable voltage from said winding, a secondary winding on said core linking only said main magnetic path, rectifying means having its input serially connected with said secondary winding across said means for obtaining a selectively variable voltage thereby forming an autotransformer connection of said secondary winding to said primary winding, a direct current saturating winding on said core linking only said shunt magnetic path, a pair of direct current motor armature output terminals, the output of said rectifying means and said saturating winding being serially connected across said output terminals whereby said saturating winding is energized by motor armature current, a pair of direct current motor field output terminals, and second rectifying means connecting at least a part of said first winding to said last-named output terminals.

5. A control system for operating a direct current motor and for selectively controlling the speed thereof from an alternating current source, said system comprising a pair of alternating current input terminals, a transformer having a core, said core having a main magnetic path and a shunt magnetic path, a first winding on said core linking both said main and shunt magnetic paths and having one end thereof and a point intermediate its end respectively connected to said input terminals thereby forming a primary winding, said winding having a plurality of taps thereby to obtain a selectively variable voltage therefrom, switching means for selecting said taps, a secondary winding on said core linking only said main magnetic path and having one end thereof connected to said one end of said first winding, a bridge rectifier having one input terminal connected to the other end of said secondary winding and having its other input terminal connected to said switching means thereby forming an autotransformer connection of said secondary winding to said primary winding, a direct current saturating winding on said core linking only said shunt magnetic path, a pair of direct current motor armature output terminals, the output terminals of said rectifier and said saturating winding being serially connected across said direct current motor armature output terminals whereby said saturating winding is energized by motor armature current, a pair of direct current motor field output terminals, and a half-wave rectifier connected in series between the other end of said first winding and one of said last-named output terminals, the other of said last-named output terminals being connected to a point on said first winding thereby to provide a voltage for energizing the motor field winding.

No references cited.